United States Patent

[11] 3,568,077

[72] Inventor Yoshiaki Fujimoto
Gardena, Calif.
[21] Appl. No. 756,923
[22] Filed Sept. 3, 1968
[45] Patented Mar. 2, 1971
[73] Assignee Northrop Corporation
Beverly Hills, Calif.

[54] PSEUDO VOLTAGE CONTROLLED OSCILLATOR
6 Claims, 13 Drawing Figs.

[52] U.S. Cl. 328/155, 328/63, 307/269, 307/295
[51] Int. Cl. H03b 3/04
[50] Field of Search 331/55, 155; 307/265—267, 295, 273, 269; 332/14; 328/58, 55, 72

[56] References Cited
UNITED STATES PATENTS

| | | | |
|---|---|---|---|
| 2,489,302 | 11/1949 | Levy | 332/14X |
| 2,852,610 | 9/1958 | Levine | 332/14X |
| 3,048,714 | 8/1962 | Poole | 332/14X |
| 3,436,682 | 4/1969 | Birnbaum | 307/273X |
| 3,441,877 | 4/1969 | Thompson | 307/265X |

*Primary Examiner*—Roy Lake
*Assistant Examiner*—James B. Mullins
*Attorneys*—William W. Rundle and Willard M. Grahm

ABSTRACT: For use in a VLF navigation system, such as the Omega Navigation system, a phase tracking loop in a receiver receives incoming signals from transmitting stations. The tracking loop contains four electronically controlled pseudo voltage-controlled oscillators, to eliminate the need for all but one master crystal oscillator, whose outputs provide necessary signals within the receiver. The pseudo oscillator comprises an integrator and a voltage-to-phase converter using an external clock pulse input and suitable control logic. The voltage-to-phase converter comprises a one-shot multivibrator in which the delay time is proportional to the input signal level. Thus, the periods between return times of the one-shot multivibrator to its original state provide a frequency which is controlled by input voltage level. When the phase-shift range exceeds ±90°, the trigger pulse to the one-shot multivibrator is advanced or delayed, and the integrator is reset to zero.

INVENTOR:
Yoshiaki Fujimoto
By William W. Rundle
AGENT

INVENTOR
Yoshiaki Fujimoto

By William W. Rundle
AGENT

INVENTOR:
Yoshiaki Fujimoto

By William W. Rundle

AGENT

INVENTOR:
Yoshiaki Fujimoto
By William W. Rundle
AGENT

INVENTOR:
Yoshiaki Fujimoto

By William W. Rundle
AGENT

INVENTOR:
Yoshiaki Fujimoto

By William W. Rundle
AGENT

PSEUDO VOLTAGE CONTROLLED OSCILLATOR

The present invention relates to voltage controlled oscillators, and more particularly, to a pseudo voltage-controlled oscillator having a high degree of stability.

Voltage controlled oscillators find application as modulators in phase or frequency-modulated transmitters and in phase locked loops as used in telemetry. The stability of a voltage-controlled oscillator, i.e., the ability to maintain a constant frequency with zero input voltage, is of considerable importance in many of the applications. In a transmitter, this would determine the center frequency, and in the case of a very narrow bandwidth phase-locked loop, this would influence the ability of the loop to acquire the signal.

One approach which has been used to make a stable controlled oscillator is to make it basically a crystal oscillator and control the frequency by means of a varicap shunting the crystal. If the crystal and associated circuitry are placed in a temperature-controlled oven, the circuit can be made extremely stable. However, when several voltage-controlled oscillators are required, this approach becomes prohibitive both in size and cost.

It is an object of the present invention to overcome these problems by providing a voltage controlled oscillator having as high a degree of stability as a crystal-controlled oscillator.

When several highly stable voltage-controlled oscillators are required in a given system, it is a further object of this invention to provide several pseudo voltage controlled oscillators all slaved to a master oscillator which may be a crystal oscillator, so that the stability of the several shaved units will be as good as the high quality master oscillator.

Briefly, my invention in broad form comprises a voltage-to-phase converter preceded by a resettable integrator to which the incoming voltage signal is fed. A reference frequency signal from a master oscillator is also provided to the converter. The converter output gives the desired voltage-controlled oscillator signal. In a preferred form of the invention, the voltage-to-phase converter comprises a one-shot multivibrator to which the reference frequency is applied as a trigger. Mixed with the trigger input is the output of an operational amplifier fed from the aforesaid integrator. A feedback from the multivibrator output also goes to the input of the operational amplifier. The feedback circuit may include a chopper ad low-pass filter. To make the system continuously operable when the phase shifted output of the multivibrator exceeds a maximum, logic means is connected to the multivibrator output. This includes a pair of crossover detecting flip-flops and various gates connected to delay or advance the trigger pulse to the multivibrator as required, and further includes means for resetting the integrator to zero at the same time.

The present invention will be more fully understood from the detailed description of specific embodiments to follow, and by reference to the accompanying illustrative drawings.

Figure 3:
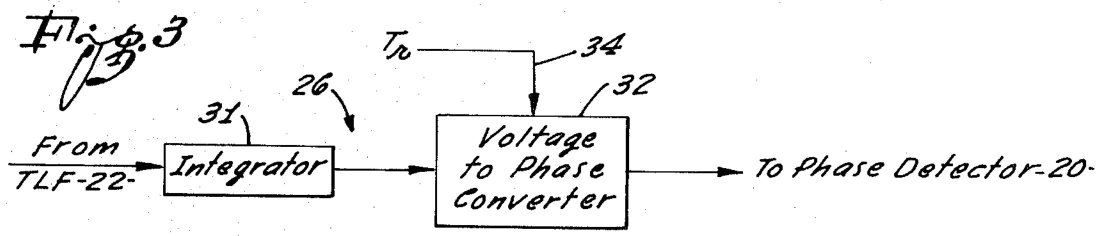
FIG. 3 is a block diagram showing the basic constituents of the pseudo voltage-controlled oscillator.
Figure 3A:
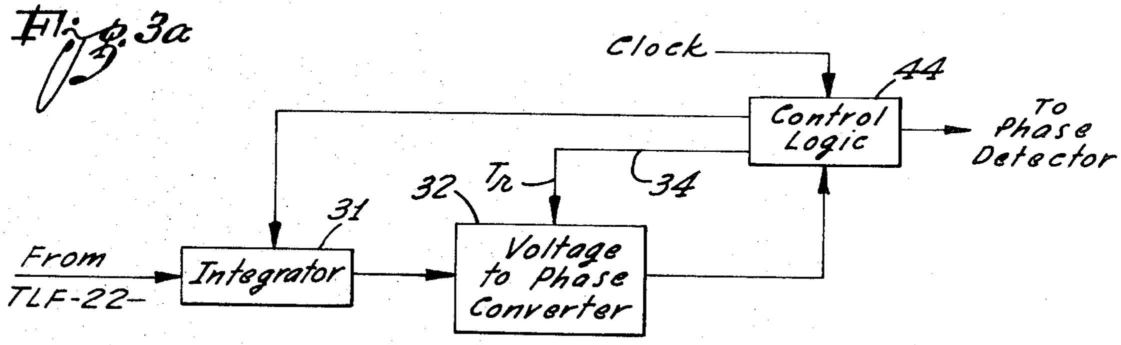

FIG. 3*a* is a block diagram of a complete pseudo voltage controlled oscillator as used in the navigation receiver.

Figure 4:
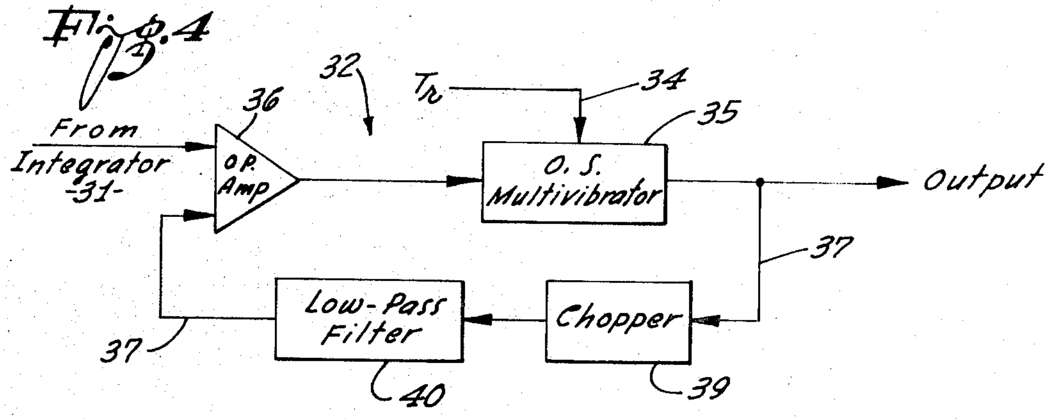

FIG. 4 is a block diagram of the voltage-to-phase converter portion of the pseudo voltage-controlled oscillator.

Figure 5:
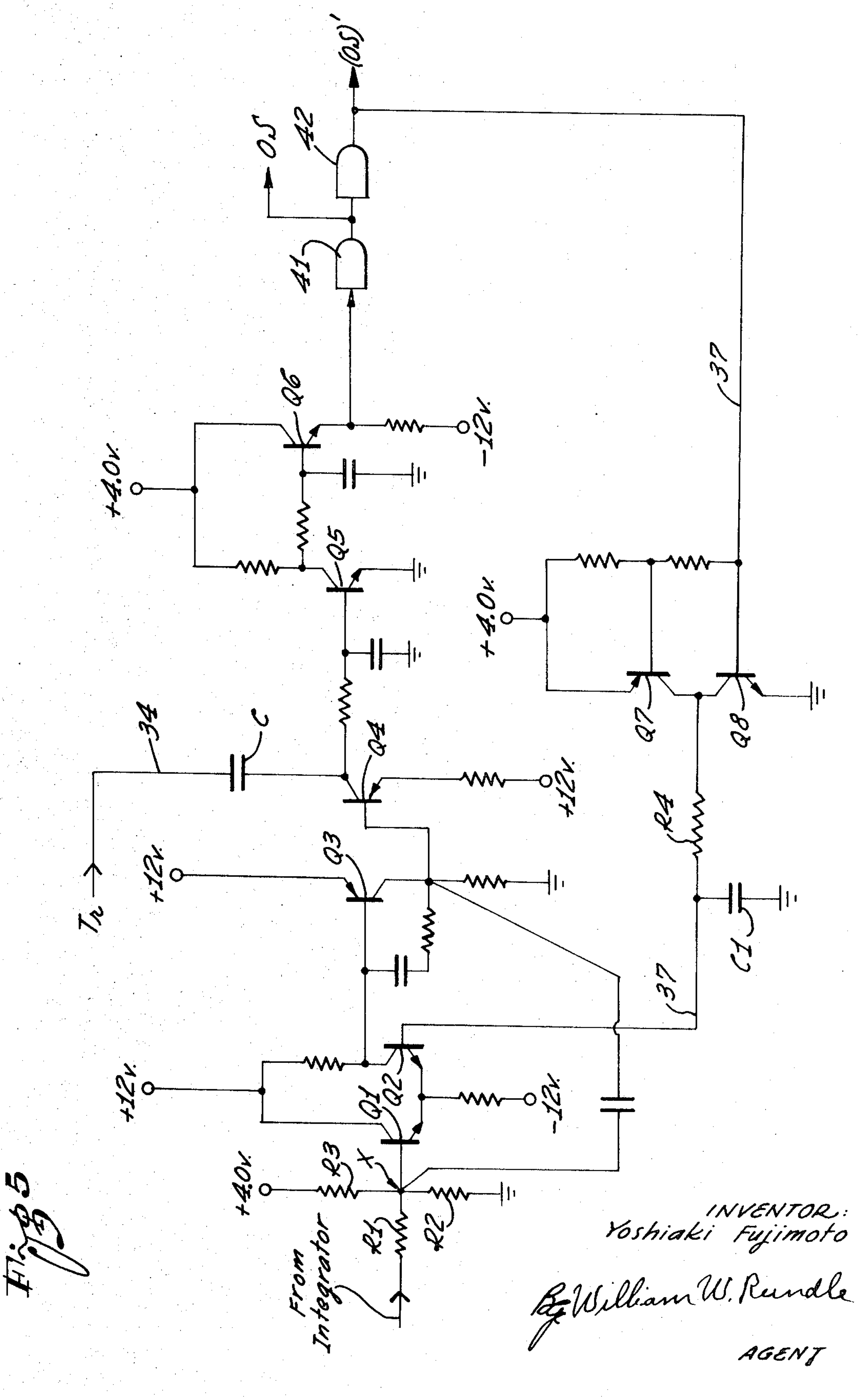

FIG. 5 is a complete schematic diagram of the voltage-to-phase converter, showing circuitry of an operational amplifier, one-shot multivibrator, chopper and low-pass filter.

Figure 6:
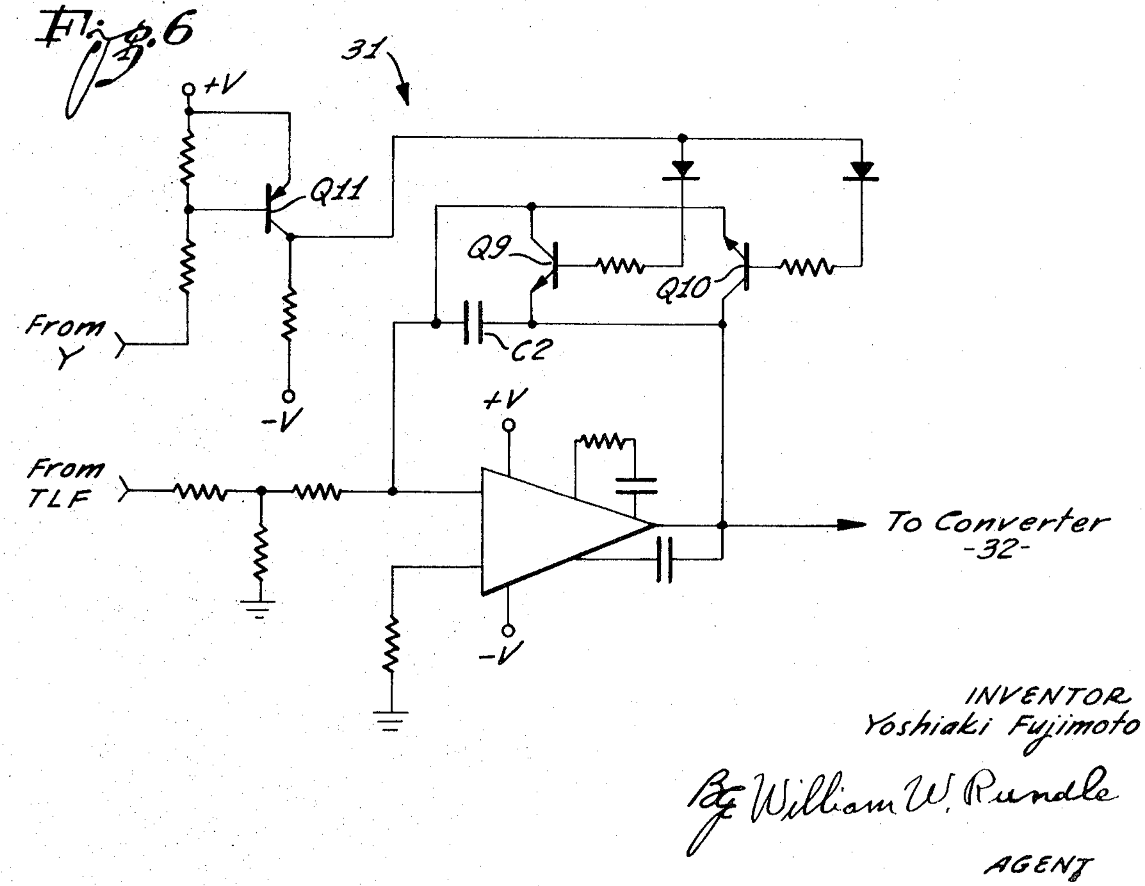

FIG. 6 is a schematic diagram of the integrator.

Figure 7:
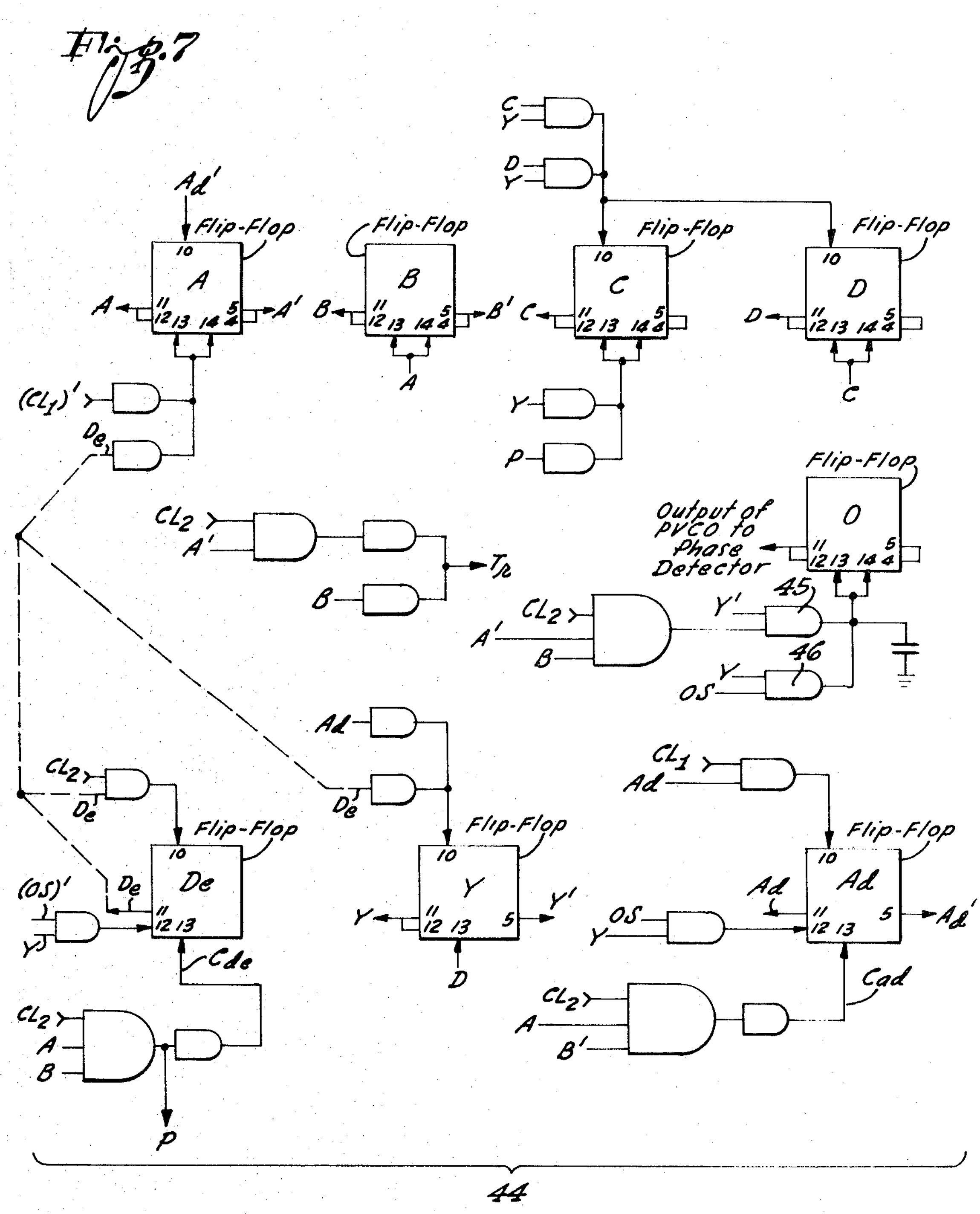

FIG. 7 is a circuit diagram of the control logic, showing all of the flip-flops and gates involved in a preferred system. To avoid the confusion of wires, identifying letters are shown. Points with common identification letters are connected directly together.

Figure 8:
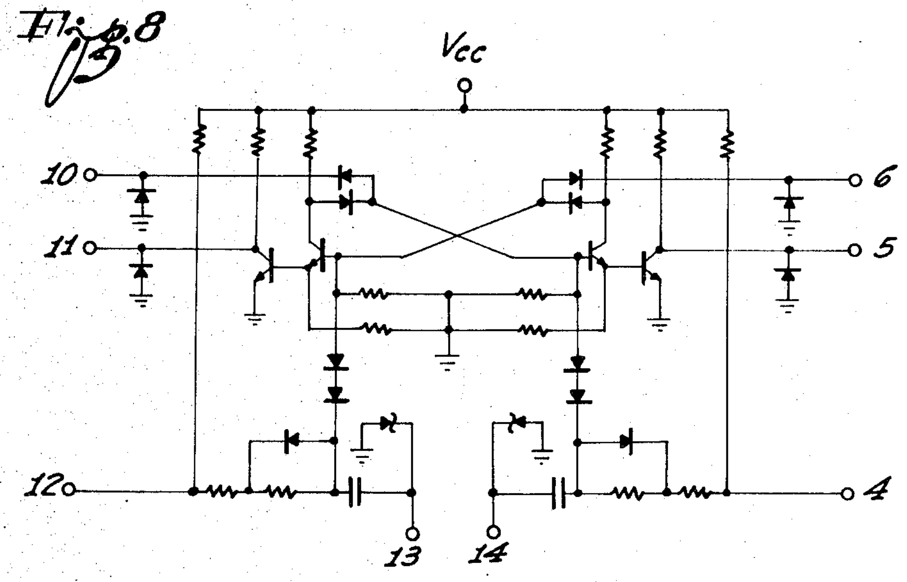

FIG. 8 is a schematic diagram of a typical flip-flop as used in the circuit of FIG. 7.

FIGS. 9, 10, 11 and 12 are waveforms showing the timing of various pulse signals in the control of the present voltage controlled oscillator.

Figure 1:
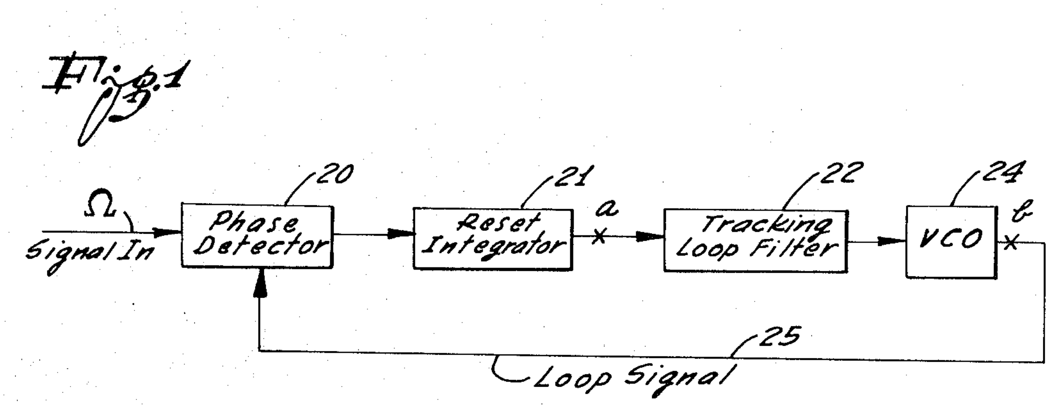
FIG. 1 is a block diagram of a tracking loop in a navigation receiver, showing where the present voltage controlled oscillator is connected.

Referring first to FIG. 1 for a detailed description of the present invention, there is shown a block diagram of a tracking loop in an Omega Navigation System receiver. The tracking loop comprises a phase detector 20 into which the Omega intermediate frequency signal from a transmitting station enters. The phase detector output goes into a reset integrator 21, and then through a tracking loop filter 22 for the particular station being received. A voltage-controlled oscillator 24 follows, and a feedback line 25 connects the loop signal back to the phase detector 20.

Figure 2:
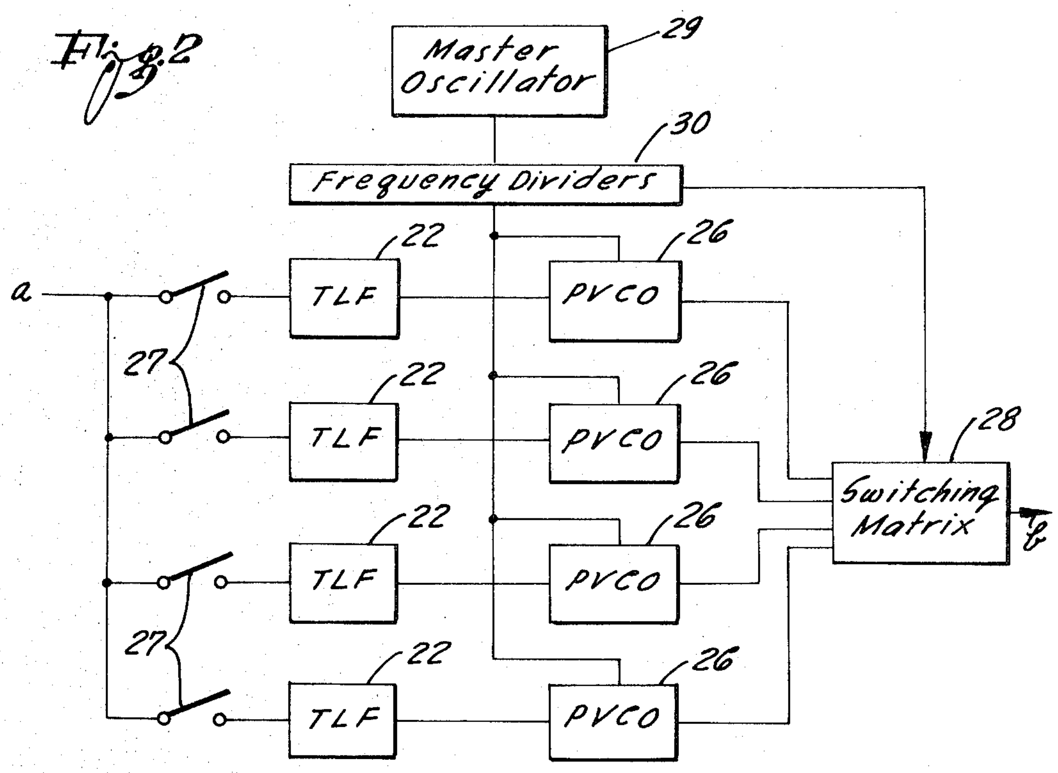
FIG. 2 is a block diagram showing how several tracking loops are incorporated in an actual receiver.

Actually, the receiver contains four tracking loop filters 22 as shown in FIG. 2, one for each of four relatively widely spread transmitting stations being received, and there are four pseudo voltage controlled oscillators 26, along with switching means 27 and 28 not described in this application. Points *a* and *b* of FIG. 2 are connected into the FIG. 1 circuit at the corresponding indicated points. A single master oscillator 29 is provided, and frequency dividers 30 may be used to produce any desired reference frequency signal for synchronizing the pseudo voltage-controlled oscillators 26.

FIG. 3 shows the basic concept of the present pseudo voltage controlled oscillator (hereinafter referred to as pseudo VCO). This comprises an integrator 31 receiving an input from the tracking loop filter 22, followed by a voltage-to-phase converter 32 which also receives a trigger signal on a trigger line 34, which is a reference frequency mentioned previously.

The integrator portion of FIG. 3 is shown in detail in FIG. 6. Transistors Q9 and Q10, when conducting, will short circuit across integrator capacitor C2. This action occurs from operation of a transistor Q11 and a signal Y input thereto, which will be described later.

The voltage-to-phase converter 32 is further shown in FIG. 4. A signal T*r* on trigger line 34 triggers a one-shot multivibrator 35 whose function is to provide a delay time proportional to the input signal level. An operational amplifier 36 precedes the one-shot multivibrator 35, the input to this amplifier being from the integrator 31. Accuracy of the above mentioned delay time (or phase shift) is maintained by a feedback circuit 37 from the multivibrator output to the operational amplifier 36, this latter circuit preferably including a chopper 39 and a low-pass filter 40. Thus, the voltage-to-phase converter 32 is a phase shifter which converts a DC or slowly varying electrical signal into phase information.

FIG. 5 shows a preferred embodiment of voltage-to-phase converter 32. Transistors Q1, Q2, and Q3 make up the operational amplifier 36. Q4 is a control transistor for the one-shot multivibrator 35 which is formed by Q5, Q6 and capacitor C. A first NAND gate 41 and a second NAND gate 42 provide two opposite polarity outputs labeled OS and (OS)' respectively. Q7 and Q8 constitute the chopper 39 while capacitor C1 and resistor R4 act as the low-pass filter 40. The feedback signal goes to the base of transistor Q2.

Figure 9:
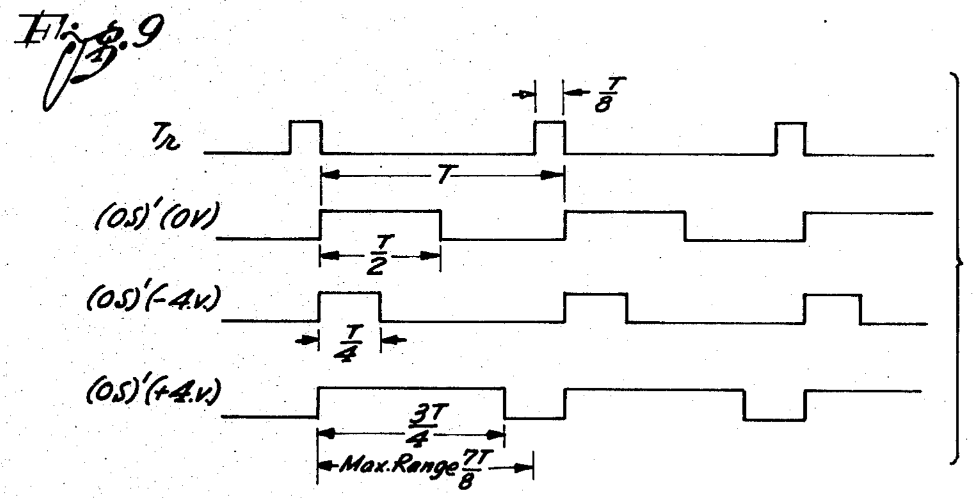
Figure 10:
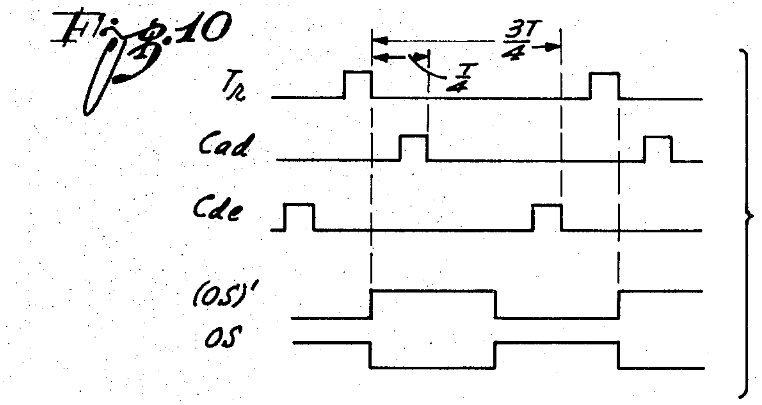

Point X in FIG. 5 is a summing junction for the operational amplifier 36. Resistor R1, R2, and R3, connected to a point X, provide a voltage at X of + 3 volts, + 2 volts, and + 1 volt for the respective input voltages of + 4 volts, 0 volts, and − 4 volts from the integrator 31 at the left end of R1. The base of Q2 is biased by the averaged DC of the multivibrator output signal which is shaped by chopper Q7 and Q8 and low-pass filter R4 and C1. The operation of operational amplifier 36 is such that the DC voltages at the bases of Q1 and Q2 are equal. The output of stage Q3 controls the current through Q4, which in turn controls the turn-on time of Q5 after it has been turned off by the trailing edge of the square T*r* pulse. The multivibrator output from Q6 is reshaped by gates 41 and 42 and also fed to the chopper Q7 and Q8. Therefore, the repetition rate of the output OS or (OS)′ is the same as that of the T*r* pulse; however, the fall time of (OS)′ or the rise time of OS is a function of the input signal level from the integrator 31. This principle is illustrated in FIG. 9. The voltage values are those as existing at different times at the output of the integrator 31.

In operation, assume a zero volt signal at the input and output of integrator 31. Multivibrator output will be a 50 percent duty cycle square wave at the frequency of the T*r* signal. This could be called the $f_o$ frequency of the system. Now if a small positive or negative DC voltage appears at the input of integrator 31, the integrator output becomes a ramp signal, and the fall time of multivibrator output (OS)′ as shown in FIG. 9 will slowly retard or advance progressively with each successive cycle. Thus a frequency keyed by the fall times of (OS)′ will be the desired VCO output, and it is seen that the integrator 31 and phase shifter 32 form a VCO. The integrator 31 in this example has a negative output for a positive input and vice versa.

It can be seen from FIG. 9 that the maximum phase shift range is ± 135°. Thus if it is desired to phase shift in one direction continuously with respect to the reference signal, the triggering clock into the one-shot multivibrator 35 must be switched at some preset point before the range is exceeded. In this preferred embodiment to be described, the preset point is set at ± 90°.

Figure 11:
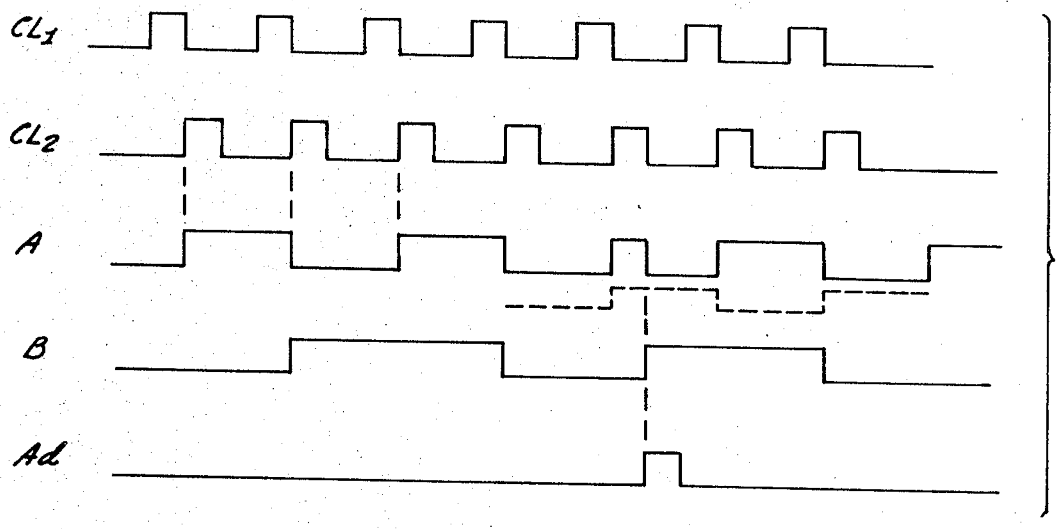
Figure 12:
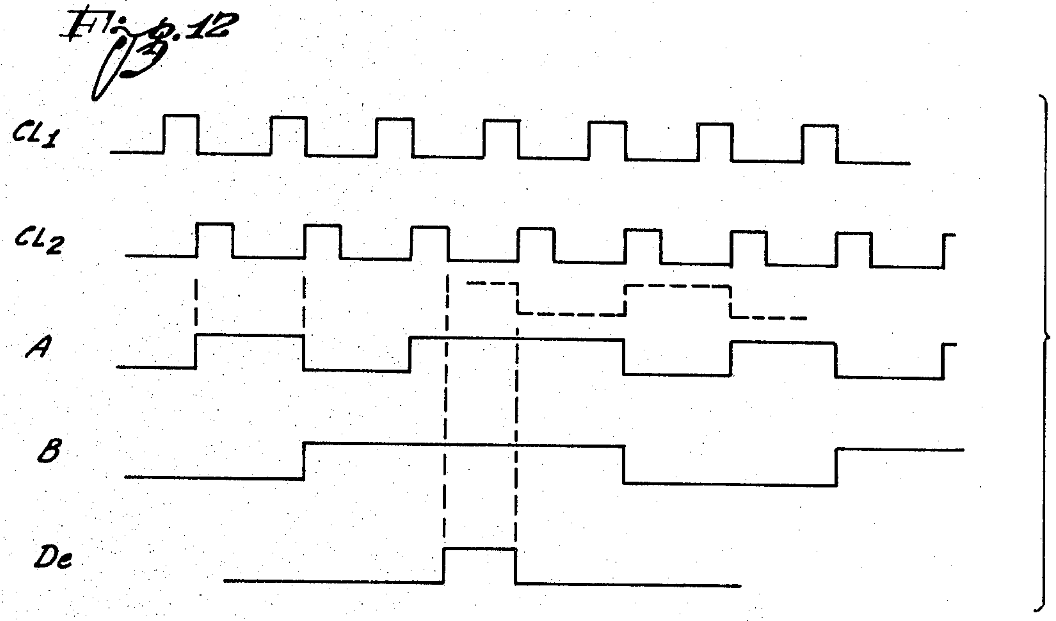

The crossover at ± 90° is detected and the necessary circuit operations accomplished by control logic 44 in FIG. 3*a*, which is further shown in detail in FIG. 7. In this detailed drawing, all gate symbols represent NAND gates, and the squares are bistable flip-flops, with interconnections as indicated by corresponding letter designations. The dashed line connecting all D*e* points or terminals is representative of all such connections. Most of the flip-flops can be identical type R-S flip-flops as shown in FIG. 8, for example. The output flip-flop O may be similar, but is preferably a type J-K flip-flop. The required inputs to FIG. 7 are two clock pulse signals $CL_1$ and $CL_2$ as shown in FIGS. 11 and 12. These clock signals are provided from the master oscillator 29 through certain portions of the frequency dividers 30 indicated in FIG. 2. The inputs OS and (OS)′ to FIG. 7 come from the gates 41 and 42 in FIG. 5.

Flip-flops A and B are in effect counters which in conjunction with gates as shown, provide the following logic signals:

$$Tr = CL_2A'B'$$

$$Cad = CL_2AB'$$

$$Cde = CL2AB$$

The input to flip-flops A and B of FIG. 7 is primarily $CL_1$ but additional inputs A*d*′ and D*e* are supplied to flip-flop A. The above signals C*ad* and C*de* are supplied to input terminals 13 of flip-flops A*d* and D*e*, respectively, while the T*r* signal is of course supplied to one-shot multivibrator 35. Clock signals $CL_1$ and $CL_2$ have a frequency four times that of the normal T*r* frequency, or the ratio of clock frequency to T*r* can be some power of two times four. In a typical system, $CL_1$ and $CL_2$ are 816 Hz and T*r* is 204 Hz.

As mentioned above, whenever the phase shift exceeds the preset ± 90°, the T*r* signal must be either advanced or delayed with respect to the reference time represented by the clock pulses. A*d* and D*e* denote advance and delay. Note that in FIG. 10, C*ad* lags T*r* by *T*/4 and C*de* lags T*r* by 3*T*/4. Therefore, C*ad* and C*de* are used to detect + 90° and −90° respectively.

As seen from FIG. 7, flip-flop A*d* will be triggered when C*ad* AND Y(OS) exist simultaneously. This causes signal A*d* at output pin 11 to become "one" (high level state) and signal A*d*′ at pin 5 to become "zero" (low level state). When A*d*′ becomes zero, flip-flop A will be reset to zero, which means that the output of flip-flop A will be advanced by one clock pulse, as shown by FIG. 11. The dotted line in the middle of FIG. 11 indicates the A waveform if it had not been changed.

Also, when A*d* becomes "one," flip-flop A*d* will reset itself at pin 10 with the rise of $CL_1$. Thus, A*d*′ becomes high again, which enables flip-flop A to again free-run with the $CL_1$ clock signal.

Flip-flop D*e* will be triggered when C*de* and Y(OS)′ exist simultaneously, causing signal D*e* to become "one." As shown by FIGS. 7 and 12, when D*e* becomes "one," this blocks a $CL_1$ pulse from flip-flop A, causing the output A to be delayed by one clock pulse. The dotted line in the middle of FIG. 12 again indicates the A waveform if it had not been changed. Also, flip-flop D*e* will reset itself with the rise of $CL_2$, which enables each triggering of flip-flop D*e* to block only one $CL_1$ pulse.

Since A and B, along with $CL_2$, determine T*r*, through the gates shown in FIG. 7, the above delay or advance of the A signal produces a similar delay or advance of the T*r* signal.

Whenever the T*r* pulse is advanced or delayed, the multivibrator delay circuit requires a certain time to restore its steady state operation. During this transient period the VCO output must be smooth and maintain its timing. The flip-flops C and D are counters provided to take care of this transient time. Upon the triggering of either A*d* or D*e*, flip-flop Y will be reset to zero and C and D will start to ripple down $CL_2$ AB, as shown in FIG. 7 by the connection at point P. Flip-flop Y will be set back to one at the fall time of signal D. During the time when Y is zero (Y′ is one), the signal into the output flip-flop O becomes Y′ $CL_2$ A′B through gate 45 instead of Y(OS) through gate 46, while the OS signal is returning to steady state from the transient state caused by change in timing of the T*r* signal. Thus the pseudo VCO output to the phase detector 20 will not be disturbed during the transient interval.

Also, while Y is zero, the integrator 31 in FIG. 6 is reset to zero by turning on transistor Q11 to cause Q9 and Q10 to discharge capacitor C2. Thus, the pseudo VCO is ready to "-start over again" until the next time that the phase shift might reach ± 90°.

Thus it is seen that since the T*r* pulse can change its timing with respect to a reference frequency from the master oscillator 29, but still be driven or controlled by the master oscillator, the present integrator 31, phase converter 32, and control logic 44 form a complete pseudo voltage controlled oscillator. The phase converter or shifter 32 described in this preferred embodiment is all electronic, yet for other purposes it may be of a different type or nature, such as a mechanical phase shifter or resolver having a rotary member. Any number of the present pseudo VCO's can be operated from only one master oscillator, and they will all have the same output stability as the master oscillator.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

I claim:

1. In a system requiring a plurality of stable synchronized voltage controlled oscillators, the improvement comprising a single stable master oscillator and a plurality of pseudo voltage-controlled oscillators; each of said pseudo voltage controlled oscillators comprising an integrator fed by the desired control voltage, and a voltage-to-phase converter connected to the output of said integrator; and means for providing a reference trigger signal to each of said phase converters from said master oscillator, whereby said pseudo voltage-controlled oscillators all have the same stability as said master oscillator.

2. A voltage-controlled oscillator comprising an integrator, means for connecting a desired control voltage to the input of said integrator, a one-shot multivibrator, an operational amplifier connected between the output of said integrator and the input of said multivibrator, a reference frequency source, means for connecting said reference frequency source to said multivibrator input to trigger said multivibrator, and a feedback circuit from the output of said multivibrator to an input of said amplifier, whereby the delay time of said multivibrator is proportional to the integral of said control voltage.

3. Apparatus in accordance with claim 2 wherein said feedback circuit comprises a chopper and a low-pass filter.

4. A voltage-controlled oscillator comprising an integrator, means for connecting a desired control voltage to the input of said integrator, a one-shot multivibrator, means for connecting the output of said integrator to the input of said multivibrator, a reference frequency source, means producing trigger pulses derived from said reference frequency source and means connecting said trigger pulses to said multivibrator input to trigger said multivibrator, whereby the delay time of said multivibrator is proportional to the integral of said control voltage, a first flip-flop for detecting a positive multivibrator phase shift of a predetermined amount, a second flip-flop for detecting a negative phase shift of said predetermined amount, counter means fed by clock pulses from said reference frequency source, gate means for obtaining said trigger pulses from said counter means, said clock pulses having a frequency which is a predetermined multiple of the trigger pulse frequency, and operative connections from said first and second flip-flops to said counter means to advance or delay the output waveform of said counter means responsive to said detection so as to advance or delay said trigger pulses by one clock pulse, and means for resetting the control voltage level at said multivibrator input substantially simultaneously with the adjustment of said trigger pulses, whereby continuous phase shift relative to said reference frequency is enabled.

5. Apparatus in accordance with claim 4 wherein said resetting means comprises a third flip-flop connected to be temporarily triggered by either of said first and second flip-flops, normally open-switching means connected around said integrator, and means responsive to triggering of said third flip-flop for closing said switching means, whereby said integrator is reset to zero.

6. A voltage controlled oscillator comprising a resettable integrator, a voltage-to-phase converter connected to the output of said integrator, means for supplying a reference frequency signal to said converter, and control logic sensing the output phase of said converter, said logic including first means for advancing or delaying said signal to said converter by one reference frequency pulse before the output of said converter reaches its maximum plus-or-minus phase shift range, respectively, and said logic including second means for resetting said integrator to zero at the same time as said advance or delay.